United States Patent
Odman (10) Patent No.: US 7,289,535 B2
(45) Date of Patent: Oct. 30, 2007

(54) METHOD OF ACCOMMODATING FRAGMENTATION AND BURST IN A WIRELESS PROTOCOL

(75) Inventor: Knut T. Odman, Vienna, VA (US)

(73) Assignee: Freescale Semiconductor, Inc., Austin, TX (US)

(*) Notice: Subject to any disclaimer, the term of this patent is extended or adjusted under 35 U.S.C. 154(b) by 1133 days.

(21) Appl. No.: 10/388,168

(22) Filed: Mar. 14, 2003

(65) Prior Publication Data

US 2003/0210710 A1 Nov. 13, 2003

Related U.S. Application Data

(60) Provisional application No. 60/364,116, filed on Mar. 15, 2002.

(51) Int. Cl.
*H04J 3/24* (2006.01)
(52) U.S. Cl. .................. 370/473; 470/278; 470/329
(58) Field of Classification Search ............ 370/278, 370/328, 329, 336, 337, 347, 442, 419, 473
See application file for complete search history.

(56) References Cited

U.S. PATENT DOCUMENTS

2003/0169769 A1* 9/2003 Ho et al. ............... 370/473

* cited by examiner

*Primary Examiner*—John Pezzlo (57) ABSTRACT

A method is provided for sending information in a wireless network. A service data unit is broken up by a transmitter into multiple fragments that are sent as the payloads of respective data frames transmitted to a receiver. Each of these frames includes a service data unit identifier identifying the service data unit the fragment is associated with, a fragment number indicating the position of the fragment within the associated service data unit, and a total fragment value indicating the total number of fragments in the service data unit. The receiver extracts the service data unit fragments, buffers them, and uses the fragments to reconstruct the service data unit. The receiver is able to efficiently buffer the fragments because of the service data unit identifier, fragment number, and total fragment value contained in each frame.

10 Claims, 6 Drawing Sheets

METHOD OF ACCOMMODATING FRAGMENTATION AND BURST IN A WIRELESS PROTOCOL

CROSS-REFERENCE TO RELATED PATENT DOCUMENTS

This application relies for priority on U.S. provisional application Ser. No. 60/364,116, by Knut T. Odman, filed Mar. 15, 2002, entitled "METHOD OF ACCOMMODATING FRAGMENTATION AND BURST IN A WIRELESS PROTOCOL," the contents of which are hereby incorporated by reference in their entirety.

BACKGROUND OF THE INVENTION

The present invention relates to wireless personal area networks and wireless local area networks. More particularly, the present invention relates to a method for more efficiently handling fragmentation and burst transmissions in a wireless network.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

Figure 1:
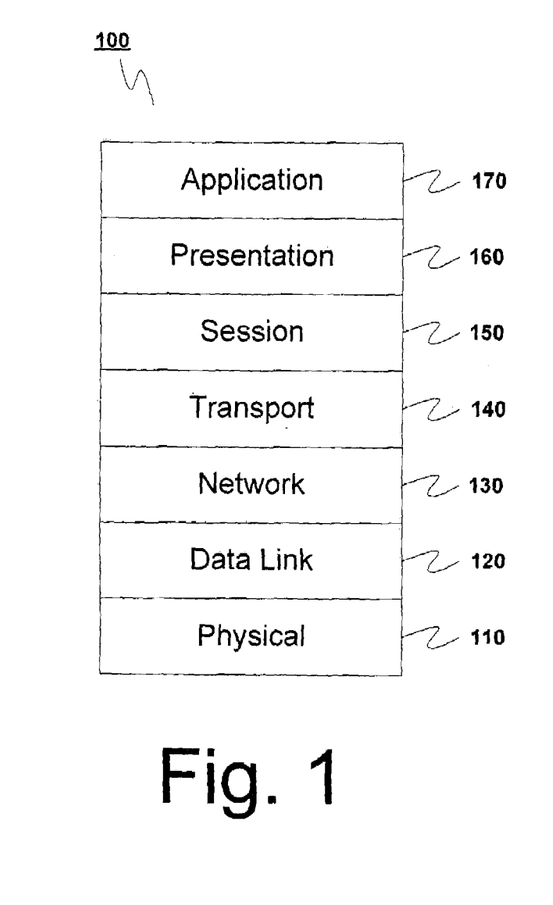
FIG. 1 is a diagram showing the hierarchy of the seven-layered OSI standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

Figure 2:
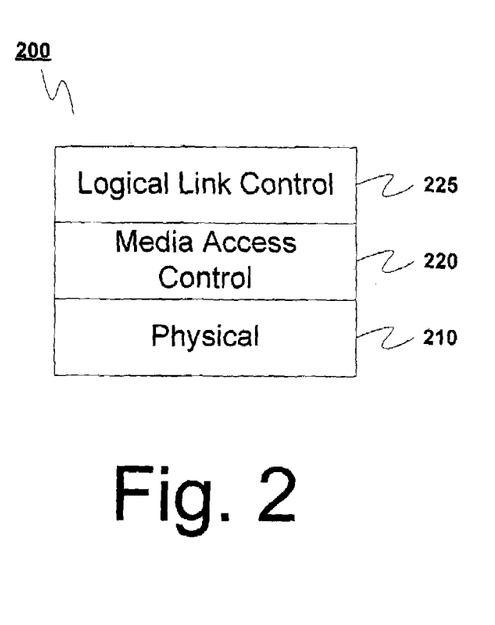
FIG. 2 is a diagram showing the IEEE 802 standard.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

Figure 3:
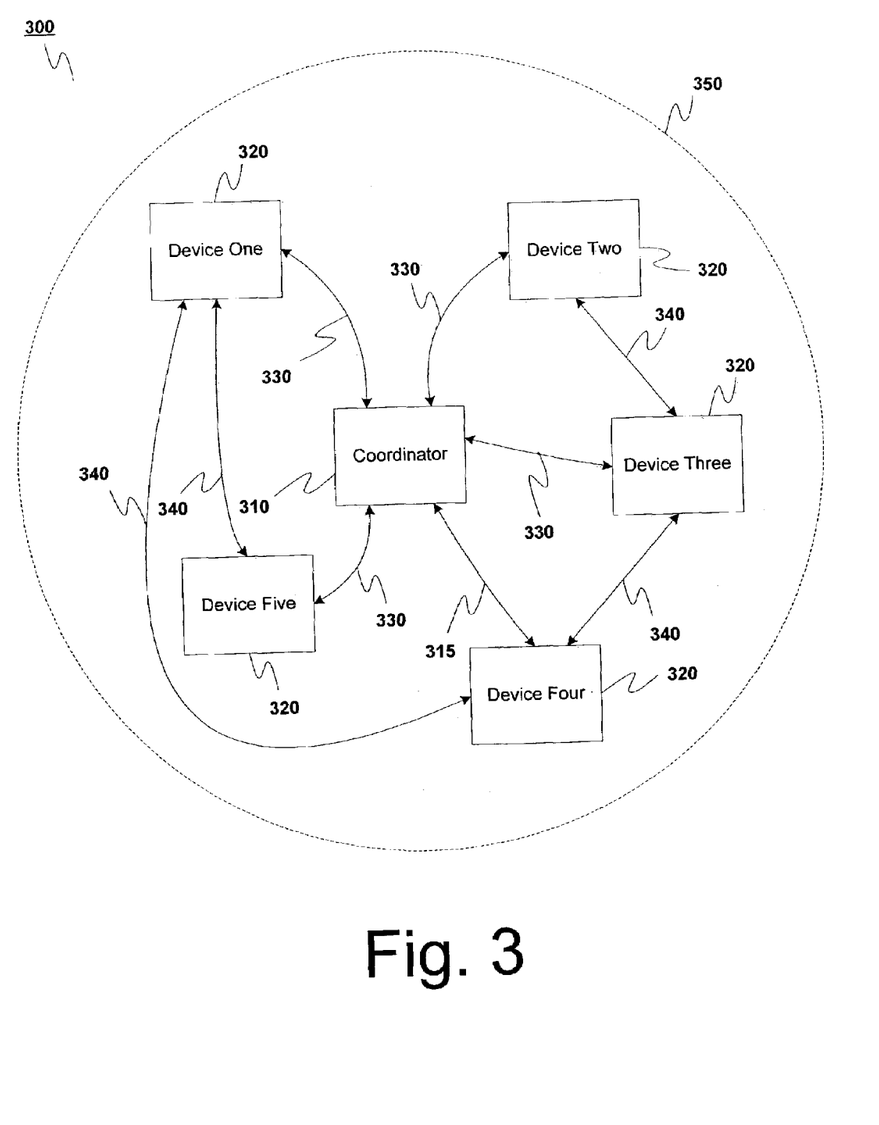
FIG. 3 is a block diagram of a wireless network according to a preferred embodiment of the present invention.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course if the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

Figure 4:
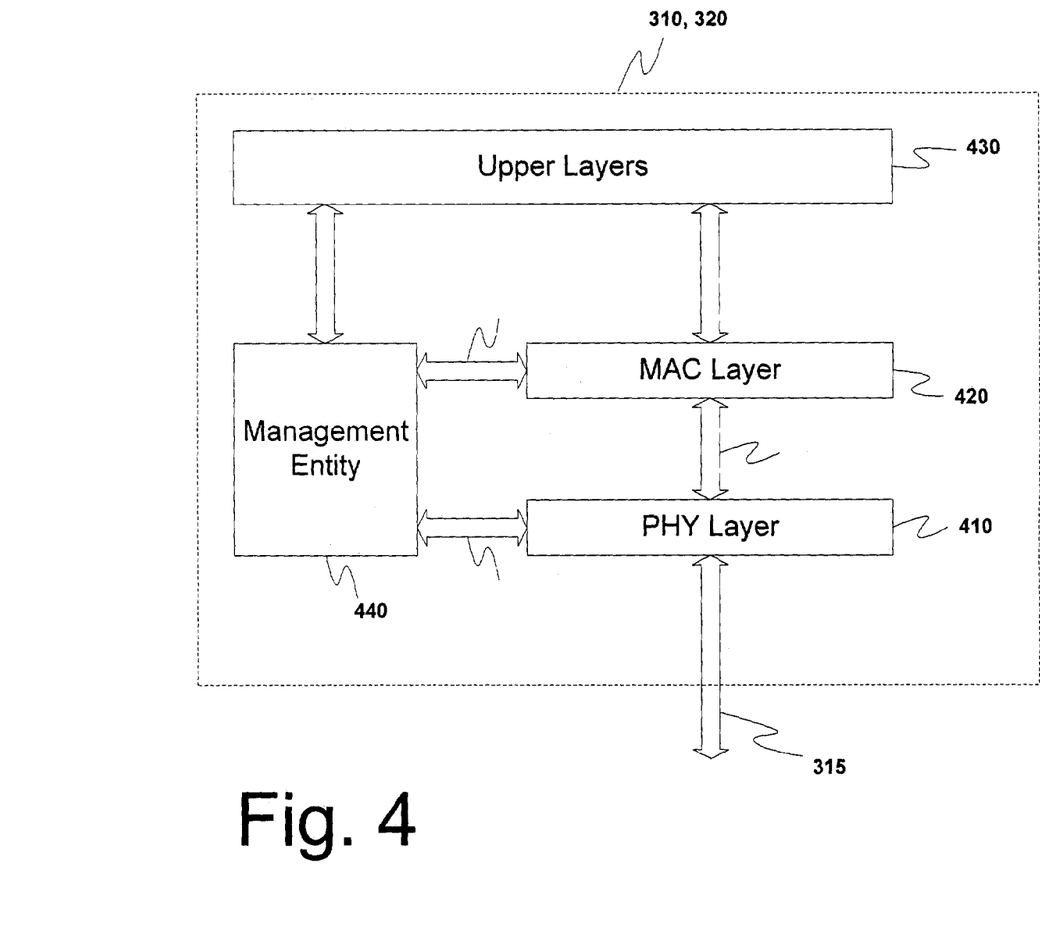
FIG. 4 is a block diagram of a device from the network of FIG. 3.

FIG. 4 is a block diagram of a device 310, 320 from the network 300 of FIG. 3. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 430 include the functionality of the device 310, 320. These upper layers 430 may include a logical link control (LLC) or the like. The upper layers allow the MAC layer 420 to interface with various protocols, such as TCP/IP, TCP, UDP, RTP, IP, USB, 1394, UDP/IP, ATM, DV2, MPEG, or the like.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

The present invention provides a method of coordinating devices 310, 320 either operating in a network 300 or trying to join a network 300 through the use of cyclic beacons inside superframes that define the data path across the network 300.

Device IDs and MAC Addresses

One important aspect of working with devices 310, 320 in a network 300 is uniquely identifying each of the devices 310, 320. There are several ways in which this can be accomplished.

Independent of any network it is in, each device 310, 320 has a unique MAC address that can be used to identify it. This MAC address is generally assigned to the device by the manufacturer such that no two devices 310, 320 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 320 in the network 300 to use in addition its unique MAC address. In the preferred embodiments the MAC 420 uses ad hoc device IDs to identify devices 310, 320. These device IDs can be used, for example, to route frames within the network 300 based on the ad hoc device ID of the destination of the frame. The device IDs are generally much smaller than the MAC addresses for each device 310, 320. In the preferred embodiments the device IDs are 8-bits and the MAC addresses are 48-bits.

Each device 310, 320 should maintain mapping table that maps the correspondence between device IDs and MAC addresses. The table is filled in based on the device ID and MAC address information provided to the non-coordinator devices 320 by the coordinator 310. This allows each device 310, 320 to reference themselves and the other devices in the network 300 by either device ID or MAC address.

SUMMARY OF THE INVENTION

Consistent with the title of this section, only a brief description of selected features of the present invention is now presented. A more complete description of the present invention is the subject of this entire document.

An object of the present invention is to provide a method of sending a service data unit between two devices in an efficient manner.

Another object of the present invention is to provide an improved method of reconstructing a fragmented service data unit in a receiving device.

These and other objects are accomplished by way of a method of sending information in a wireless network. This method may comprise: breaking a service data unit into first through $N^{th}$ service data unit fragments; assigning the first through $N^{th}$ service data unit fragments as payloads for first through $N^{th}$ frames, respectively; and transmitting the first through $N^{th}$ frames. In this method, each the first through $N^{th}$ frames contains a first designator, a second designator, and a third designator, the first designator identifying the service data unit, the second designator identifying a position in the service data unit of the respective first through $N^{th}$ service data unit fragment assigned as payload, and the third designator identifying a total number of fragments N that the service data unit has been broken into. N is preferably an integer greater than 1.

The first, second, and third designators in each of the first through $N^{th}$ frames are preferably formed in a header.

When N is an integer greater than 2, the first through $(N-1)^{th}$ service data unit fragments are preferably the same size.

Another method is also provided of sending information in a wireless network. This method comprises: breaking a service data unit into first through $N^{th}$ service data unit fragments; assigning the first through $N^{th}$ service data unit fragments as payloads for first through $N^{th}$ frames, respectively; and transmitting the first through $N^{th}$ frames. In this method each the first through $N^{th}$ frames contains a first designator, a second designator, and a third designator, the first designator identifying the service data unit, the second designator identifying a position in the service data unit of the respective first through $N^{th}$ service data unit fragment assigned as payload, and the third designator indicating whether the frame is the $N^{th}$ frame or not. N is preferably an integer greater than 1.

The first, second, and third designators in each of the first through $N^{th}$ frames are preferably formed in a header.

When N is an integer greater than 2, the first through $(N-1)^{th}$ service data unit fragments are preferably the same size.

Another method is also provided of sending information in a wireless network. This method comprises: breaking a service data unit into first through $N^{th}$ service data unit fragments in a transmitter device; assigning the first through $N^{th}$ service data unit fragments as payloads for first through $N^{th}$ frames, respectively, the first through $N^{th}$ frames each containing a first designator, a second designator, and a third designator; transmitting the first through $N^{th}$ frames from the transmitter device; receiving the first through $N^{th}$ frames from the transmitter device at a receiver device; extracting the first through $N^{th}$ service data unit fragments from the first through $N^{th}$ frames; and reconstructing the service data unit using the first through $N^{th}$ service data unit fragments and the first, second, and third designators from each of the first through $N^{th}$ frames. In this method, the first designator identifies the service data unit, the second designator identifies a position in the service data unit of the respective first through $N^{th}$ service data unit fragment assigned as payload, and the third designator identifies a total number of fragments N that the service data unit has been broken into. N is preferably an integer greater than 1.

The first, second, and third designators in each of the first through $N^{th}$ frames are preferably formed in a header.

When N is an integer greater than 2, the first through $(N-1)^{th}$ service data unit fragments are preferably the same size.

The step of reconstructing the service data unit may further comprise: assigning each of the first through $N^{th}$ service data unit fragments into a buffer defined by the first designator, each of the first through $N^{th}$ service data unit fragments being assigned a place in the buffer based on the second designator associated with the respective first through $N^{th}$ service data unit fragment; and reconstructing the service data unit based on the contents of the buffer when the buffer is filled.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which.

DETAILED DESCRIPTION OF THE PREFERRED EMBODIMENTS

Preferred embodiments of the present invention will now be described with reference to the drawings. Throughout the several views, like reference numerals designate identical or corresponding parts.

Superframes

The available bandwidth in a given network 300 is split up in time by the coordinator 310 into a series of repeated superframes. These superframes define how the available transmission time is split up among various tasks. Individual frames of data are then transferred within these superframes in accordance with the timing set forth in the superframe.

Figure 5:
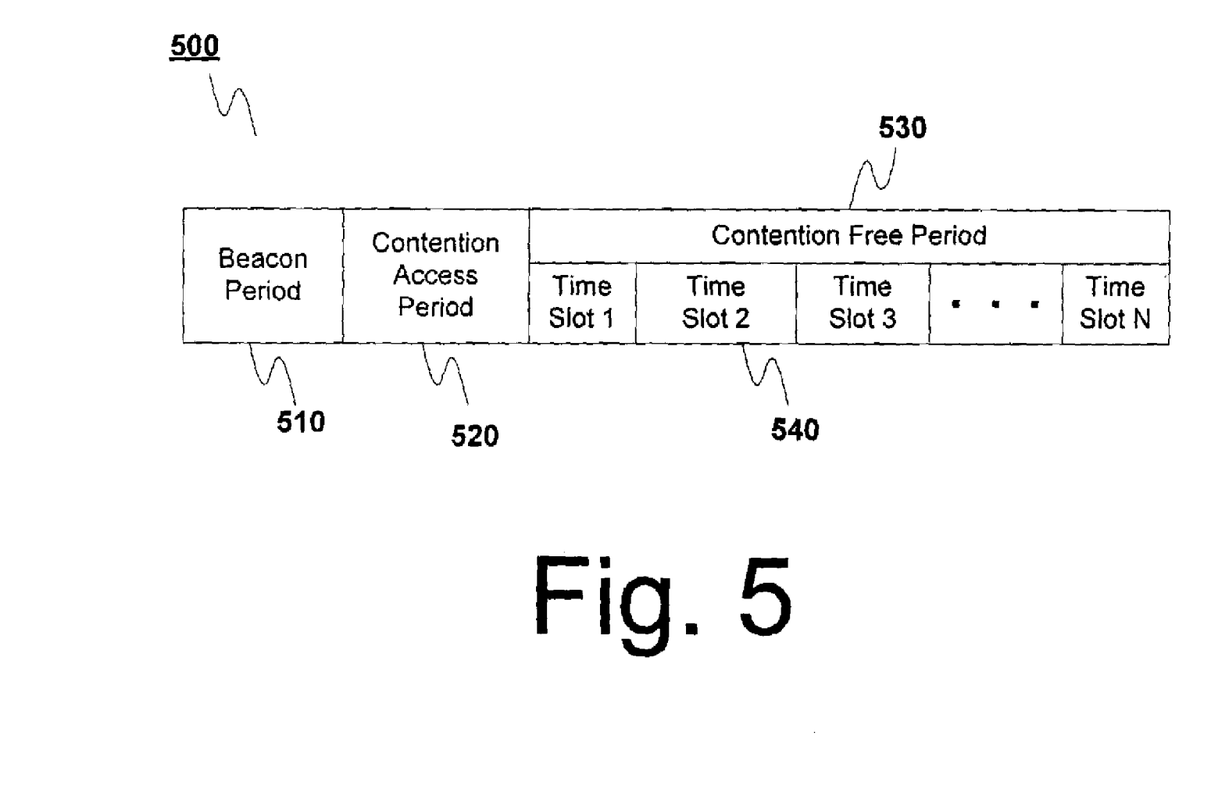
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame out to the non-coordinator devices 320 in the network 300. Such a beacon frame will include information for organizing the operation of devices within the superframe. Each non-coordinator device 320 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to a single transmitting device 310, 320 and one or more receiving devices 310, 320 for transmission of information between them. Generally each time slot 540 is assigned to a specific transmitter-receiver pair, though in some cases a single transmitter will transmit to multiple receivers at the same time. Exemplary types of time slots are: management time slots (MTS) and guaranteed time slots (GTS).

An MTS is a time slot that is used for transmitting administrative information between the coordinator 310 and one of the non-coordinator devices 320. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device.

A GTS is a time slot that is used for transmitting isochronous non-administrative data between devices 310, 320 in the network 300. This can include data transmitted between two non-coordinator devices 320, or non-administrative data transmitted between the coordinator 310 and a non-coordinator device 320.

As used in this application, a stream is a communication between a source device and one or more destination devices. The source and destination devices can be any devices 310, 320 in the network 300. For streams to multiple destinations, the destination devices can be all or some of the devices 310, 320 in the network 300.

In some embodiments the uplink MTS may be positioned at the front of the CFP 530 and the downlink MTS positioned at the end of the CFP 530 to give the coordinator 310 a chance to respond to an uplink MTS in the in the downlink MTS of the same superframe 500. However, it is not required that the coordinator 310 respond to a request in the same superframe 500. The coordinator 310 may instead respond in another downlink MTS assigned to that non-coordinator device 320 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 320 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310.

For simplicity, a single guard time value may be used for the entire superframe. The guard time will preferably be placed at the end of each beacon frame, GTS, and MTS.

Figure 6:
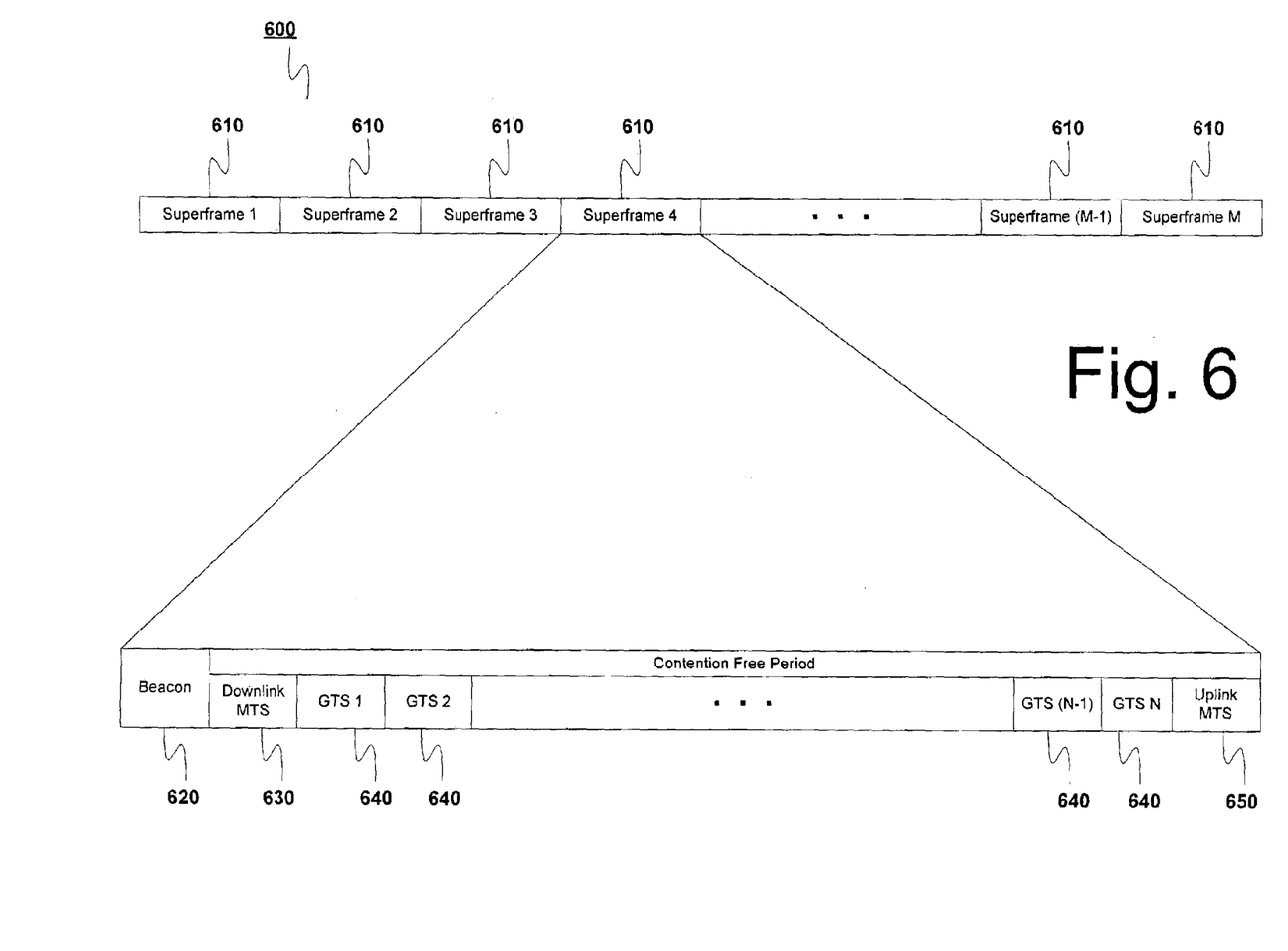
FIG. 6 is a block diagram of a specific superframe design according to a preferred embodiment of the present invention.

The exact design of a superframe 500 can vary according to implementation. FIG. 6 shows an example of a specific superframe design. As shown in FIG. 6, the transmission scheme 600 involves dividing the available transmission time into a plurality of superframes 610. Each individual superframe 610 includes a beacon frame 620, an uplink MTS 630, a plurality of GTS 640, and a downlink MTS 650. This exemplary superframe includes no contention access period.

The beacon frame 620 indicates by association ID (known as a device ID in the IEEE 802.15.3 draft standard) a non-coordinator device 320 that is assigned to the current superframe 610. It also indicates via a receive-transmit table the transmitter/receiver assignments for the individual GTS 640.

In the exemplary superframe structure shown in FIG. 6, the uplink MTS 630 is set aside for the non-coordinator device 320 assigned to the current superframe 610 to upload signals to the coordinator 310. All other non-coordinator devices 320 remain silent on the current channel during this time slot. In alternate embodiments that use multiple channels, all other stations on that channel must remain silent during an uplink MTS 630, though they may still transmit on alternate channels.

The plurality of GTS 640 are the time slots set aside for each of the devices 310, 320 to allow communication between devices. They do so in accordance with the information set forth in the receive-transmit table in the beacon 620. Each GTS 640 is preferably large enough to transmit one or more data frames. When a transmitter-receiver set is assigned multiple GTS 640, they are preferably contiguous.

The downlink MTS 650 is set aside for the coordinator 310 to download signals to the non-coordinator device 320 assigned to the current superframe 610. All other non-coordinator devices 320 may ignore all transmissions during this time slot.

The lengths of the uplink and downlink MTS 630 and 650 must be chosen to handle the largest possible management frame, an immediate acknowledgement (ACK) frame, and the receiver-transmitter turnaround time. The GTS 640, the length and number must be chosen to accommodate the specific requirements of frames to be transmitted, e.g., short MPEG frames, large frames of the maximum allowable length, and the ACK policy used.

Although the disclosed embodiment uses one uplink MTS 630 placed before a plurality of GTS 640, and one downlink MTS 650 placed after a plurality of GTS 640, the number, distribution, and placement of MTS 630, 650 and GTS 640 may be varied in alternate embodiments.

However, such a TDMA protocol in general has no support for asynchronous data. A system is forced to use a static stream connection for the passing of asynchronous data, which leads to a large signal overhead, or to provide an asysnchonous period (e.g., a CAP 520) that uses a contention access protocol like carrier sense multiple access/collision avoidance (CSMA/CA), which leads to performance degradation and to power usage increase The power consumption is increased because every device 310, 320 must remain powered up during the CAP 520 (i.e., none of the devices 310, 320 can enter a power-saving sleep mode). The performance is degraded because there is less certainty of a given data frame being transmitted at any given time.

Frames

Figure 7:
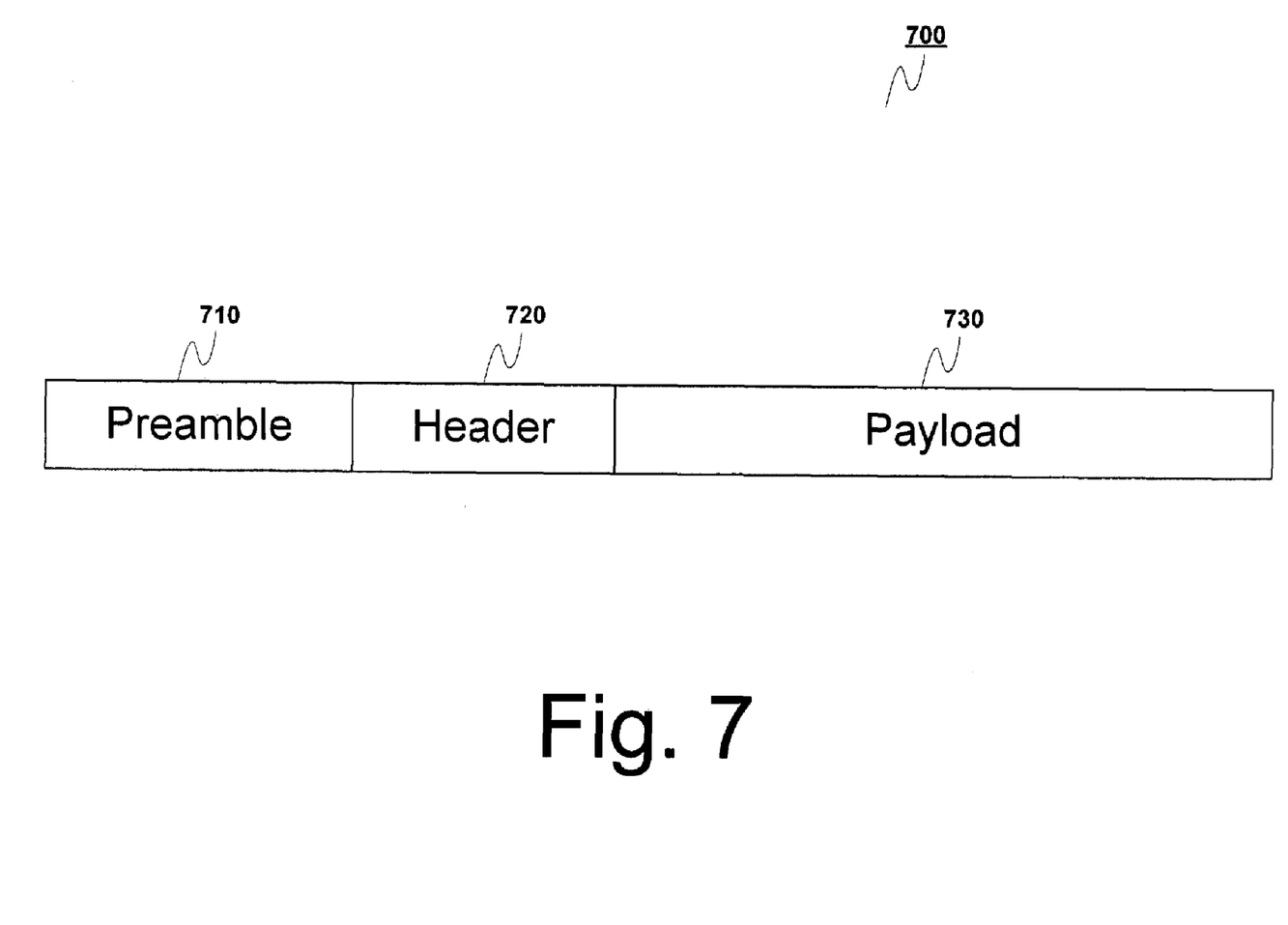
FIG. 7 is a block diagram of a frame according to a preferred embodiment of the present invention.

As noted above, signals are sent between devices in the form of frames. FIG. 7 is a block diagram of a frame according to a preferred embodiment of the present invention. Frames can be management frames, data frames, acknowledgement frames, etc. depending upon their payload.

As shown in FIG. 7, the frame 700 includes a preamble 710, a header 720, and payload 730. Each portion of the frame 700 is made up of a series of pulses representing the bits of data in that portion of the packet 700.

In the preamble 710, the transmitting device sends a known sequence of signals, while the receiving device listens for this known sequence in order to properly lock onto the signal. No substantive data is sent in the preamble 710 since the receiving device is still getting its timing synchronized with that of the transmitting device.

The header 720 includes information about the intended recipient of the frame 700 and other identifying information. In the case where a plurality of frames include fragmented data, the header 720 should also include any information necessary to correctly reassemble the fragments contained in the plurality of frames.

The payload 730 includes the substantive information being transmitted by the frame 700. This can be data if the frame is a data frame, acknowledgement information if it is an acknowledgement frame, management information if it is a management frame, etc.

Generally, the preamble 710 and the header 720 will be of fixed size, while the payload 730 may vary in size. Thus, the size of a given frame 700 will generally vary depending upon the size of the payload 730 it carries.

Service Data Units

Although information is sent between devices in the form of frames, information is passed within a device in different formats. For example, data sent from the upper layers 430 of a device to the device's MAC layer 420 are in a particular format. In the preferred embodiment, data from the upper layers 430 is sent to the MAC layer 420 in the form of service data units (SDUs).

The format of SDUs is preferably determined by the upper layers 430 and the content of the SDUs should be transparent to the MAC layer 420.

Protocol Data Units

The MAC layer 420 must organize the data in the SDUs into a size that is suitable for the PHY layer 410 to transmit as payload for a frame. In the preferred embodiment, the MAC layer 420 organizes data into protocol data units (PDUs). These PDUs form the payload 730 of one or frames 700 sent from a transmitting device to a receiving device.

The maximum size of a PDU is preferably fixed for the network 300 to maintain a maximum frame size. This PHY-dependent variable may depend upon the transmission rate, e.g., at 2.4 GHz the max PDU size could be 2044 bytes.

However, SDU size may vary depending upon what information the upper layers 430 are sending to the MAC layer 420 for transmission. Thus, the PDU size may be smaller than, larger than, or the same size as a given SDU.

Fragmentation

When an SDU is the same size or smaller than the maximum PDU size, a PDU can be set to be equivalent to the SDU. However, when an SDU is larger in size than a maximum PDU size, the SDU must be broken up and formed into multiple PDUs for transmission. This process is known as fragmentation.

It is important during fragmentation that the SDU be broken up in into PDUs in a way that allows the SDU to be reconstructed from these PDUs. This will allow the receiving device to reconstruct the original SDU to pass on to its upper layers 430, once it receives all of the relevant fragments (i.e., all the relevant PDUs).

Preferably when an SDU is fragmented, all of the resulting PDUs are set to be the same size, namely the maximum PDU size. However, one PDU may be smaller to account for the fact that the SDU size may not be an integer multiple of the PDU size. In the preferred embodiment, this will be the last PDU created, being formed by the last remaining portion of the SDU that is less than or equal to the maximum PDU size.

Burst

When sending data between two devices, the transmitting device may require the receiving device to provide acknowledgement (ACK) frames to determine which of the PDUs have passed successfully from the transmitter to the receiver. In order to limit the number of ACK frames necessary, PDU frames are often sent in bursts of multiple frames within a single time slot 540. An ACK frame is then sent only after each burst, indicating which frames within the burst were successfully received.

When SDUs are larger in size than the maximum PDU size, burst and fragmentation can be connected. In such a network operation, an SDU is fragmented into a plurality of PDUs that are sent in a set of frames as a single burst. This burst is then acknowledged, and if any frames were not successfully received, the burst is repeated, but contains only those frames that were not received. This resending will continue until either all of the PDU frames that make up the SDU are successfully received and acknowledged, or some timeout procedure is invoked to designate the SDU transmission a failure.

Bursts preferably have a maximum number of frames that they can contain. This allows the receiving device to set aside necessary memory to adequately process the incoming burst.

Bursts are also preferably arranged to fit an allotted time slot 540. In other words, the size of a burst is preferably set to fill the available time slot (accounting for any ACK frame required) such that no channel time is wasted. Burst may also be smaller than an allocated time slot, although that will cause a waste of channel time. Preferably a given burst is not any larger than a time slot allocated to it.

Separating Burst and Fragmentation

In an alternate embodiment, it is preferable to separate burst and fragmentation and treat the two entirely separately. In other words, a burst need not contain only frames related to a single SDU, and fragments (i.e., PDUs) from a given SDU can be sent in different bursts. In other words, the maximum number of PDUs per SDU and the maximum burst size can be independent of each other.

By separating fragmentation and burst transmission it is possible to disconnect the fragmentation from some of the limitations of burst, e.g., the maximum amount of elements allowed in each burst. If fragmentation and burst are disconnected, an SDU can be processed whose size would require it to be broken up into more PDUs than can be fit into a single burst. As a result either larger SDUs can be processed, or the maximum burst size can be reduced.

The separation of burst and fragmentation also enables the members of a given burst to be re-assigned in every burst transmission, allowing efficient retransmission and combination of any frames that will fit into the available time slot 540. In other words, since any given burst is not limited to the frames containing PDUs from a single SDU, bursts have a greater flexibility. A burst can include frames containing PDUs from multiple SDUs to fill up a given time slot 540 (up to a burst maximum). Since some fragments (i.e., PDUs) will be larger or smaller than others, this makes it easier to adjust the size of the burst to fill a given time slot 540 (i.e., fragments of different sizes can be used to fill in a burst).

Sending PDUs from Transmitter to Receiver

Ideally, each device 310, 320 will send the PDU frames for a given SDU in perfect order. For example, if an SDU is separated into ten PDUs, then ideally the transmitting device will split the SDU into first through tenth PDUs, assign the first through tenth PDUs as payloads of first through tenth frames, respectively, and send the first through tenth frames, in order, to the receiving device. The receiving device will then receive each of the first through tenth frames, in order, and extract the first through tenth PDUs. Only after all of the fragments (i.e., PDUs) of a first SDU were sent would a device begin sending the fragments of a second SDU.

However, because of the realities of a wireless network, this is not always the case. Due to scheduling and transmission repetition, SDU fragments (i.e., PDUs) may be sent by the transmitting device, and may arrive at the receiving device intertwined our out-of-order. As a result, the receiving device might receive a fragment from a second SDU before it finishes receiving all of the fragments of a first SDU.

One reason a PDU might be sent out of order is that a fragment of a second SDU might be smaller than a fragment of a first SDU, and could fit into a portion of a burst that the fragment of the first SDU would not. One reason a PDU might arrive later is that the PDU (i.e., SDU fragment) might not be successfully received in an earlier burst and might have to be resent.

As a result, it is preferable that the frame containing each SDU fragment (i.e., each PDU) include a sequence number indicating the SDU it belongs to, and a fragment number indicating its fragment location within its SDU. In addition, it is also preferable that the frame contain information indicating to the receiving device how many fragments a given SDU has been broken up into. This information regarding the number of fragments can be passed in multiple ways, as described below.

In addition, the transmitting device will preferably have a timeout period for sending a given SDU. If by the end of this timeout period the transmitting device has not received acknowledgement of receipt of all of the PDUs that make up a given SDU, the transmission of that SDU will be considered a failure, and attempts to retransmit failed SDU fragments will end. This is to keep the transmitting device from becoming hung up on a given SDU. However, this does not prevent an upper layer 430 from trying to send that same SDU at a later time. Also, every PDU and SDU may be assigned a maximum number of retries before their transmission is automatically considered a failure.

Defragmentation

Preferably fragmentation information is included in the header 720 of the frame 700 containing a given PDU. In one preferred embodiment, this header information includes an indicator of what SDU a given fragment belongs to, how many fragments (i.e., PDUs) that SDU was broken into, and what position within that fragmentation the current PDU is in. By including both a fragment counter and an indication of total fragment size in the frame header 720, defragmentation queue management is radically simplified.

This allows the receiving device to engage in static buffering of the received fragments. In other words, upon receiving a frame containing a first received fragment of a given SDU (which may or may not be the sequentially first fragment of that SDU), the receiving device can set aside a buffer of the proper size to hold all of the PDUs (i.e., fragments) that make up the SDU. By reading the header of the first received PDU frame, the receiving device can determine the PDU size and the total number of PDUs to expect, which will allow it to set aside the proper amount of buffer space. As each new fragment (i.e., PDU) is received, the receiving device can place that PDU in its proper place in the buffer. Once all of the fragments have been received, the receiving device can reconstruct the SDU.

The only situation in which the receiving device will not have enough information to create a defragmentation buffer upon first receipt of a SDU fragment is if it receives the last (i.e., shortest) PDU first. Since the last PDU may not be the same size as all of the prior PDUs, the receiving device can't rely on the length of the last PDU to be indicative of the length of the other PDUs.

Therefore, if the receiving device receives a frame that indicates that the total number of fragments and the current fragment number are the same (i.e., it is the last SDU fragment), then the PDU contained in that frame must be handled differently. The receiving device must buffer the last PDU and wait for the next received PDU frame. The PDU in that next frame will be the proper size, and can be used to create the defragmentation buffer.

This will preferably be a very rare occurrence, however. Since in the preferred embodiment the SDU fragments (i.e., PDUs) are sent out in order, the only way for the receiving device to receive the last fragment first is for all of the previous fragments to fail in transmission, while the last fragment succeeds in transmission.

In an alternate embodiment, the header information includes an indicator of what SDU a given fragment belongs to, what position within the fragmentation the current PDU is in, and whether the current PDU represents the last fragment in the SDU.

This allows the receiving device to engage in dynamic buffering of the received fragments. In other words, upon first receiving a fragment of a given SDU (not necessarily the first fragment), the receiving device can set aside a dynamic buffer for the SDU. Since the receiving device knows the PDU size and the place of each PDU received, it can place each PDU in its proper place, leaving room for any earlier PDUs. Once it receives the last PDU (i.e., once the header indicates that there are no more fragments after the current fragment), the receiving device will also know the size of the fragment so that it can determine if all fragments have been received. Once this is the case, the receiving device can reconstruct the SDU.

As above, this will not work if the receiving device receives the last (i.e., shortest) PDU first. Thus, if the receiving device receives a frame that indicates that it is the last fragment of an SDU, then the PDU contained in that frame must be handled differently. The receiving device must buffer the last PDU and wait for a previous fragment from the same SDU that will be the proper size. This numerically earlier PDU can be used to create the defragmentation buffer. For the reasons set forth above, this will be a very rare situation Acknowledgement of Bursts The receiving device preferably acknowledges the end of a burst immediately by sending an ACK frame that includes information indicating what frames were successfully received.

In one preferred embodiment the payload 730 of the ACK frame 700 can be a bitmap indicating which of the frames 700 in the burst were successfully received. In this bitmap a "1" could indicate the corresponding frame 700 was successfully received and a "0" could indicate that the corresponding frame 700 was not successfully received. For example, consider if first through fourth frames (including first through fourth PDUs) are sent from a transmitting device to a receiving device. If the first, third, and fourth frames were successfully received (not necessarily in that order), and the second frame was not successfully received, the receiving device would send the bitmap "1011" in its ACK frame.

In a preferred embodiment the bitmap will be 16 bits long. If fewer than 16 frames were sent in a given burst, then the remaining bits after the last frame position will have a value of "0." The transmitter will know how many frames were sent and can ignore these values.

In another embodiment the payload 730 of the ACK frame 700 can include additional information regarding successfully transmitted frames (e.g., SDU number, fragment number, etc.). This would require a larger ACK frame, but would provide the possibility to send frames of different sizes and with any combination of SDU number and fragment number.

Preferably the burst duration for any given burst will be a known quantity, and will be short enough to allow for an ACK frame to be sent within the same time slot 540 as the burst. As a result, the receiving device can listen during a time slot 540 until it should have heard the end of the burst. It can then send an ACK frame, whether it received the entire burst or not. Since the receiving device knows when the burst should end, it will not transmit the ACK frame before that time, preventing a possibility of collision between the burst and the ACK frame.

Furthermore, the ACK frame will preferably be sent at a known transmission rate, preferably the same rate as the burst was sent. This is because the transmitter has to make certain that there will be enough time left in the time slot 540 after the last frame of the burst to send the delayed ACK frame. And the only way the transmitter can calculate the time needed for the delayed ACK frame to be transmitted is if it sent at a known transmission rate.

Once the transmitter receives the ACK frame, it can purge from its transmission queue any PDUs that have been successfully transmitted, and can prepare the next burst for the next available time slot 540. The next burst will continue sending whatever is in the transmission queue, including all PDUs that were not successfully sent in a previous burst. Preferably one burst will be sent per allocated time slot 540. As a result, the transmitter will have time to process the delayed ACK frame and prepare the frames for the next burst while it waits for its next assigned time slot 540.

Guaranteeing Known Burst Size

There are a number of ways by which a known burst size can be achieved. According to one preferred embodiment, each frame sent within a burst will be sent within a burst frame window of uniform size, and each burst includes a set number of burst frame windows. If different size frames are used, the burst frame window must be large enough to include the largest frame that may be sent. Since the number and size of the burst frame windows is fixed, the burst size is also fixed.

In an alternate embodiment, an ACK-time offset can be includes within the current burst, preferably in the header 720 of each frame 700 in the burst. This offset value will indicate the time offset of the ACK frame from the start of the time slot 540, so that the receiving device will know when to send the ACK frame. If the receiver does not receive any of the frames in the burst, it will not send any ACK frame, and the transmitter must assume by the lack of an ACK frame that none of the frames were successfully transmitted.

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.ieee802.org/15/pub/TG3.html. Nothing in this disclosure should be considered to be incompatible with the draft 802.15.3 standard, as set forth on the IEEE 802 LAN/MAN Standards Committee web page.

Obviously, numerous modifications and variations of the present invention are possible in light of the above teachings. It is therefore to be understood that within the scope of the appended claims, the invention may be practiced otherwise than as specifically described herein.

I claim:

1. A method of sending information in a wireless network, comprising:
   breaking a service data unit into first through $N^{th}$ service data unit fragments;
   assigning the first through $N^{th}$ service data unit fragments as payloads for first through $N^{th}$ frames, respectively; and
   transmitting the first through $N^{th}$ frames,
   wherein each the first through $N^{th}$ frames contains a first designator, a second designator, and a third designator, the first designator identifying the service data unit, the second designator identifying a position in the service data unit of the respective first through $N^{th}$ service data unit fragment assigned as payload, and the third designator identifying a total number of fragments N that the service data unit has been broken into, and
   wherein N is an integer greater than 1.

2. A method of passing a service data unit between devices in a wireless network, as recited in claim 1, wherein the first, second, and third designators in each of the first through $N^{th}$ frames are formed in a header.

3. A method of passing a service data unit between devices in a wireless network, as recited in claim 1,
   wherein N is an integer greater than 2, and
   wherein the first through $(N-1)^{th}$ service data unit fragments are the same size.

4. A method of sending information in a wireless network, comprising:
   breaking a service data unit into first through $N^{th}$ service data unit fragments;
   assigning the first through $N^{th}$ service data unit fragments as payloads for first through $N^{th}$ frames, respectively; and
   transmitting the first through $N^{th}$ frames,
   wherein each the first through $N^{th}$ frames contains a first designator, a second designator, and a third designator, the first designator identifying the service data unit, the second designator identifying a position in the service data unit of the respective first through $N^{th}$ service data unit fragment assigned as payload, and the third designator indicating whether the frame is the $N^{th}$ frame or not, and
   wherein N is an integer greater than 1.

5. A method of passing a service data unit between devices in a wireless network, as recited in claim 4, wherein the first, second, and third designators in each of the first through $N^{th}$ frames are formed in a header.

6. A method of passing a service data unit between devices in a wireless network, as recited in claim 4,
   wherein N is an integer greater than 2, and
   wherein the first through $(N-1)^{th}$ service data unit fragments are the same size.

7. A method of sending information in a wireless network, comprising:
   breaking a service data unit into first through $N^{th}$ service data unit fragments in a transmitter device;
   assigning the first through $N^{th}$ service data unit fragments as payloads for first through $N^{th}$ frames, respectively, the first through $N^{th}$ frames each containing a first designator, a second designator, and a third designator;
   transmitting the first through $N^{th}$ frames from the transmitter device;
   receiving the first through $N^{th}$ frames from the transmitter device at a receiver device;
   extracting the first through $N^{th}$ service data unit fragments from the first through $N^{th}$ frames; and
   reconstructing the service data unit using the first through $N^{th}$ service data unit fragments and the first, second, and third designators from each of the first through $N^{th}$ frames,
   wherein the first designator identifies the service data unit, the second designator identifies a position in the service data unit of the respective first through $N^{th}$ service data unit fragment assigned as payload, and the third designator identifies a total number of fragments N that the service data unit has been broken into, and
   wherein N is an integer greater than 1.

8. A method of passing a service data unit between devices in a wireless network, as recited in claim 7, wherein the first, second, and third designators in each of the first through $N^{th}$ frames are formed in a header.

9. A method of passing a service data unit between devices in a wireless network, as recited in claim 7,
   wherein N is an integer greater than 2, and
   wherein the first through $(N-1)^{th}$ service data unit fragments are the same size.

10. A method of passing a service data unit between devices in a wireless network, as recited in claim 7, wherein the step of reconstructing the service data unit further comprises:

assigning each of the first through $N^{th}$ service data unit fragments into a buffer defined by the first designator, each of the first through $N^{th}$ service data unit fragments being assigned a place in the buffer based on the second designator associated with the respective first through $N^{th}$ service data unit fragment; and reconstructing the service data unit based on the contents of the buffer when the buffer is filled.

* * * * *